US008892174B2

(12) United States Patent
Weber et al.

(10) Patent No.: US 8,892,174 B2
(45) Date of Patent: Nov. 18, 2014

(54) LOUDSPEAKER

(75) Inventors: Mathias Weber, Salzweg (DE); Ewald Frasl, Biedermannsdorf (AT)

(73) Assignee: Knowles IPC (M) Sdn. Bhd., Penang (MY)

( * ) Notice: Subject to any disclaimer, the term of this patent is extended or adjusted under 35 U.S.C. 154(b) by 0 days.

(21) Appl. No.: 13/989,742

(22) PCT Filed: Nov. 23, 2011

(86) PCT No.: PCT/EP2011/070773
§ 371 (c)(1),
(2), (4) Date: May 24, 2013

(87) PCT Pub. No.: WO2012/069522
PCT Pub. Date: May 31, 2012

(65) Prior Publication Data

US 2013/0237291 A1 Sep. 12, 2013

(30) Foreign Application Priority Data

Nov. 26, 2010 (EP) .................................... 10192756

(51) Int. Cl.
*H04M 1/00* (2006.01)
*H04R 1/00* (2006.01)
*H04R 9/02* (2006.01)
*H04R 7/14* (2006.01)
*H04R 9/06* (2006.01)

(52) U.S. Cl.
CPC .. *H04R 9/02* (2013.01); *H04R 7/14* (2013.01); *H04R 9/06* (2013.01)
USPC ........ 455/569.1; 455/90.3; 381/399; 381/400

(58) Field of Classification Search
CPC ............ H04R 9/02; H04R 9/06; H04R 9/047; H04R 9/10; H04R 7/122; H04R 7/127; H04R 7/16; H04M 1/6033
USPC ........... 455/90.3, 569.1, 575.1; 381/396, 399, 381/400, 423, 430, 431; 379/432, 433.01, 379/433.02, 434
See application file for complete search history.

(56) References Cited

U.S. PATENT DOCUMENTS 6,320,972 B1 * 11/2001 Goller ........................... 381/430
6,411,723 B1 * 6/2002 Lock et al. .................... 381/431
(Continued)

FOREIGN PATENT DOCUMENTS

EP 1282337 2/2003
EP 1377115 1/2004

OTHER PUBLICATIONS

European Search Report and European Search Opinion, Appl. No. EP10192756.4, May 11, 2011.

*Primary Examiner* — Quochien B Vuong
(74) *Attorney, Agent, or Firm* — Steven McMahon Zeller; Dykema Gossett PLLC

(57) ABSTRACT

A loudspeaker comprises a voice coil and a diaphragm attached to the voice coil. The diaphragm has a generally rectangular outer shape, and comprises an outer rim (A1) having an outer edge at which the diaphragm is fixed in position and an inner section (A0) within the outer rim. The inner section (A0) comprises: an outermost area (A00) which is coupled to the voice coil and having the same generally rectangular outer shape; and an inner area (A01) comprising a periodic rib structure (A01*p*), with the ribs running parallel to the shorter side of the rectangular outer shape, and two lateral transition areas (A01*c*) between the edges of the periodic rib structure (A01*p*) and the shorter side edges of outermost area (A00).

12 Claims, 7 Drawing Sheets

(56) References Cited

U.S. PATENT DOCUMENTS

| | | | | |
|---|---|---|---|---|
| 6,594,372 | B2 * | 7/2003 | Nakaso | 381/396 |
| 6,836,551 | B2 * | 12/2004 | Kuze et al. | 381/412 |
| 6,920,957 | B2 * | 7/2005 | Usuki et al. | 381/431 |
| 7,634,102 | B2 * | 12/2009 | Takase et al. | 381/423 |
| 8,031,902 | B2 * | 10/2011 | Takewa | 381/431 |
| 8,094,864 | B2 * | 1/2012 | Inaba et al. | 381/399 |
| 8,131,001 | B2 * | 3/2012 | Toyofuku et al. | 381/398 |

* cited by examiner

LOUDSPEAKER

This invention relates to loudspeakers.

A loudspeaker comprises a membrane for generating a sound pressure wave, and a voice coil attached to the membrane. A control signal applied to the voice coil causes it to move as a result of the interaction of the resulting electromagnetic field with the magnetic field of a permanent magnet. The voice coil is typically arranged around or within a stationary permanent magnet.

The membrane typically comprises a dome shaped structure, suspended at its outer periphery and attached to the voice coil either at its centre or near to the outer periphery, radially inside the outer suspension area.

The dome area needs to have a specified resonance frequency at or above the upper limit of the overall system frequency spectrum in order to avoid disturbing effects to the sound pressure level at the useable frequency band. The resonance frequency of the dome depends on its stiffness and mass. The mass needs to be as low as possible and the stiffness needs to be tuned to the required resonance frequency.

There is therefore a trade off between the desire to use extra material to increase the stiffness, and the desire to keep the mass of the dome as low as possible. In particular, to maintain a high resonance frequency of the dome, the stiffness needs to be high. However, the mass of the dome area needs to be as low as possible for improved overall speaker performance.

The speaker architecture often limits the space for the dynamically moving membrane, so that the dome area needs to be as thin as possible in order not to reduce the space used by the membrane in use. Furthermore, extra component parts should be avoided because of the additional processing time and process complexity and additional manufacturing costs.

A known approach for achieving the requirements of the dome area is to use a stiff but light plate in addition to the flexible membrane structure. This can cause some difficulties in the production and increases the cost.

An alternative is to shape the dome using the membrane material. In this way, the mass can be kept as low as possible. Often, this results in a spherical shape for the dome, but this has the problem that the structure is too high.

There is therefore a need for a membrane design which increases the stiffness of the dome with minimum use of material and which enables a thin design to be formed.

According to the invention, there is provided a loudspeaker comprising:

- a voice coil; and
- a diaphragm attached to the voice coil,
- wherein the diaphragm has a generally rectangular outer shape, and comprises an outer rim having an outer edge at which the diaphragm is fixed in position and an inner section within the outer rim, wherein the inner section comprises:
- an outermost area which is coupled to the voice coil and having the same generally rectangular outer shape;
- an inner area comprising a periodic rib structure, with the ribs running parallel to the shorter side of the rectangular outer shape, and two lateral transition areas between the edges of the periodic rib structure and the shorter side edges of outermost area.

The invention provides a loudspeaker design in which the diaphragm can be formed from a single component, and the design enables a combination of large stiffness, small overall thickness and low mass.

The combination of the outermost area and the transition areas provides a closed and stiff frame around the periodic rib area. This frame enables the periodic rib area to be small and thereby increase the resonance frequency by decoupling the forces resulting at the edges of the periodic rib area at resonance to the rest of the membrane system.

The periodic rib area has ribs extending between the longer edges. At each point across the periodic structure, the longer edges are connected with a straight line along a rib. The straight line connection has the function of avoiding the periodic rib area being stretched/compressed along the short dimension axis. The periodic structure in general causes the periodic rib area to be stiffened in the direction of the smaller rectangle edge.

The lateral transition areas are preferably mirror symmetric about a line parallel to the shorter edges of the rectangular outer shape. The lateral transition areas can each comprise a dome. Each such dome can comprise a first portion which provides a height increase from a lowest height at the boundary with the periodic rib structure to a maximum height, and a second portion which provides a more sharply curved height decrease from the maximum height to the lowest height where the diaphragm is attached to the voice coil. The first portion has a concave shape, which provides a stiffening effect.

The second portion has a smooth transition to the first portion and a discontinuous transition to the lowest height where the diaphragm is attached to the voice coil.

The period rib structure preferably extends fully to the outermost area at the longer side edges of the outermost area. Thus, the ribs extend fully from top to bottom (with the rectangle arranged with the long side left to right), and the ribs thereby define a rigid frame with the outermost area.

The height of the periodic rib structure preferably does not exceed the height of the lateral transition areas.

The longer side of the generally rectangular diaphragm outer shape is preferably less than 100 times the diaphragm thickness. The generally rectangular outer shape preferably comprises a rectangle with rounded corners. In this case, the size of the transition areas along the longer rectangle side direction can correspond to the size of the of the corner curves of an inner edge of the outermost area. This means the ribs occupy the maximum rectangular area of the diaphragm.

Examples of the invention will now be described in detail with reference to the accompanying drawings, in which.

The invention provides a loudspeaker with a particular design of membrane.

The invention aims to provide a desired stiffness of the inner part of the membrane without needing extra parts or materials and without violating the restriction of a limited dome height.

The stiffness of the dome is proportional to the frequency response spectrum of the loudspeaker at a certain frequency band (between 6 kHz and 12 kHz) depending on the resonance frequency of the dome itself and the resonance frequency of the coil which is connected to the dome.

The advantage of the invention is a large cost reduction during manufacturing of the transducer by not using extra parts and bonding processes to have a defined stiffness of the dome.

Figure 1A:
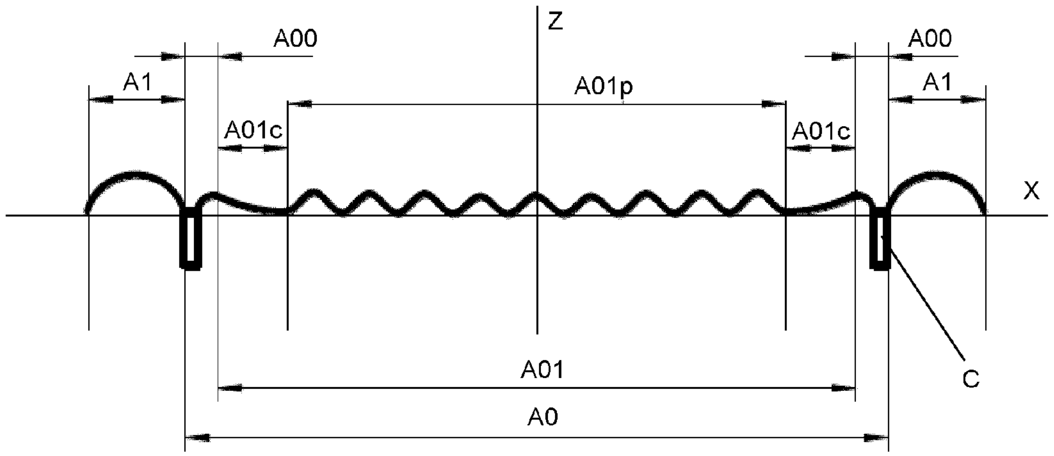
FIG. 1A shows a cross section of the membrane of a loudspeaker of the invention.
Figure 1B:
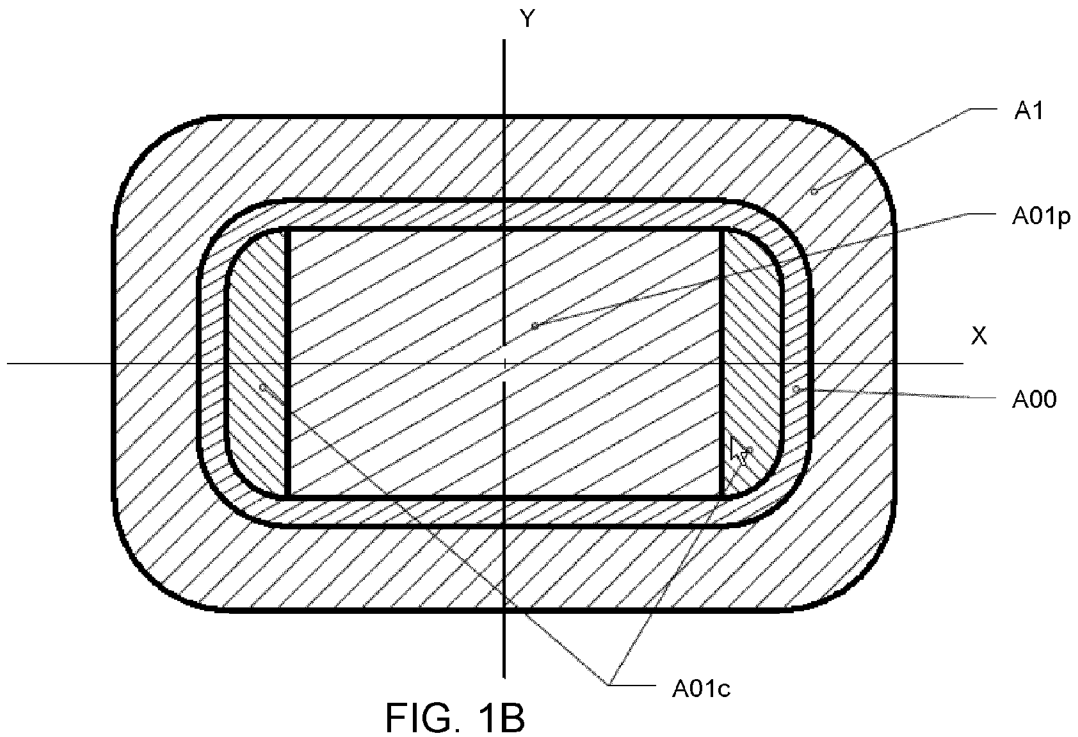
FIG. 1B shows the membrane of FIG. 1A in plan view.

FIG. 1A shows a cross section of the membrane of the invention, and FIG. 1B shows the membrane in plan view. The cross section of FIG. 1A is along the x-axis shown in FIG. 1B.

The diaphragm has a generally rectangular outer shape as shown in FIG. 1B. By “generally” rectangular, is meant the shape is rectangular, though with rounded corners. Also, the sides do not of course need to be perfectly straight.

The diaphragm can be formed from polymer plastics: (PAR, PEN, PET, PEEK, PC, PA, . . . ). It may be a single material or a compound structure. Silicones, rubbers, paper and fiber compounds are also possible.

The diaphragm has an outer rim (A1) having an outer edge at which the diaphragm is fixed in position. The outer edge of the outer rim (A1) is mounted to the loudspeaker enclosure. The outer rim (A1) is the elastic part of the diaphragm suspension.

The inner edge of the outer rim (A1) defines the start of an inner section (A0) within the outer rim. The inner section (A0) is intended to be an inelastic part.

The outermost area (A00) of the inner section (A0) is coupled to the voice coil (C) and has the same generally rectangular outer shape.

Movement of the voice coil thus causes the outer rim (A1) to flex. The outer rim (A1) allow this movement and therefore is not designed to be very rigid. It provides a restoring force to a neutral position. The outer rim (A1) comprises a single dome shape as shown extending between the outermost area (A00) of the inner section (A0) and the fixation point of the diaphragm.

The inner section (A0) has an inner area (A01) which includes a central area (A01*p*) in the form of a periodic rib structure, with the ribs running parallel to the shorter side of the rectangular outer shape.

This rib section (A01*p*) provides the membrane rigidity and is the part which generates the sound pressure wave in response to voice coil movement. The ribs can have a generally sinusoidal profile.

The inner area (A01) of the inner section (A0) also has two lateral transition areas (A01*c*) between the edges of the central rib area (A01*p*) and the shorter side edges of outermost area (A00). These transition areas are only along the shorter sides.

There is a more direct coupling at the end of the ribs to the longer sides of the outermost area (A00). This means the structure is very rigid in the y axis direction.

To give the diaphragm the desired compliance, the structure is less rigid in the x axis direction, by virtue of the transition areas (A01*c*).

The transition areas themselves (A01*c*) are stiff in both directions because they link to the corner radius. Thus, the width of the transition regions (i.e. the dimension along the longer x-axis direction) corresponds to the corner radius of the inner edge of the outermost area (A00).

The lateral transition areas (A01*c*) are mirror symmetric about the y axis, and they each comprise a dome.

Figure 2:
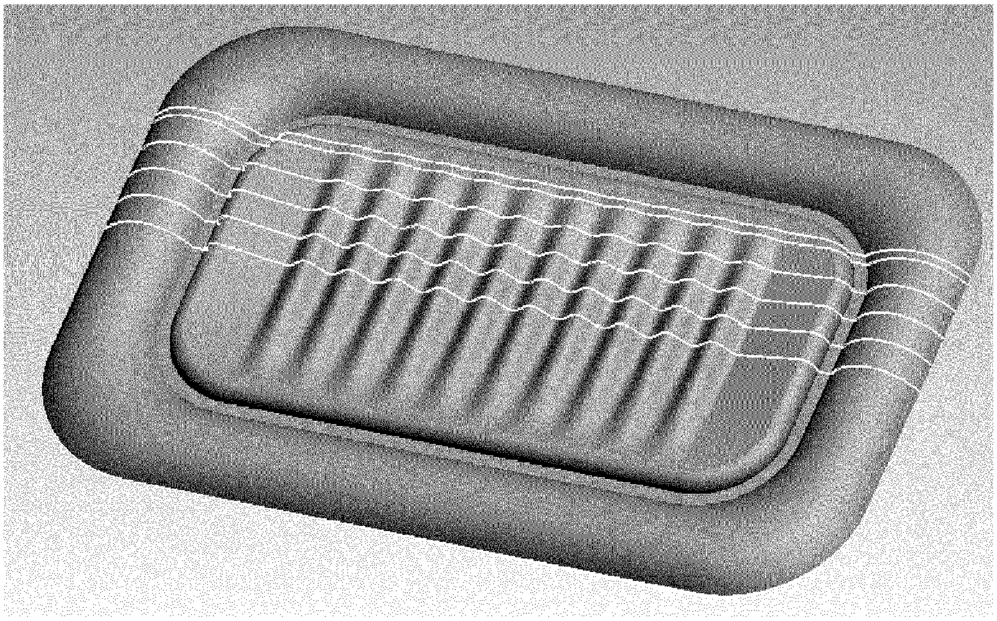
FIG. 2 shows the membrane of FIG. 1A in perspective view.

FIG. 2 shows the membrane in perspective view. This shows more clearly how the ribs extend almost fully from the top to the bottom of the rectangle. The ribs flatten at their ends (flattening to their peaks rather than their troughs), so that they make a smooth transition to the outermost area (A00). FIG. 2 also shows more clearly that the flat mounting for the voice coil comprises a well which extends all around the generally rectangular shape.

Figure 3:
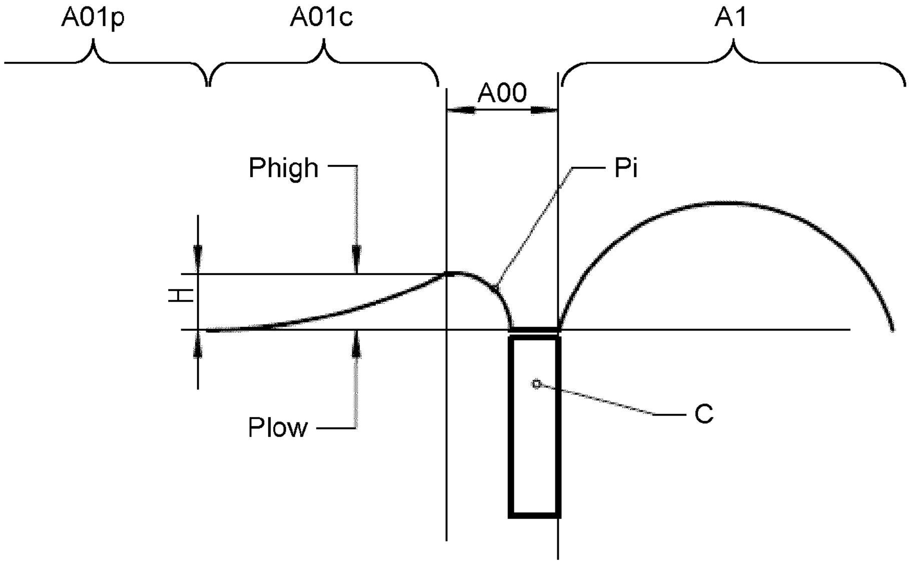
FIG. 3 shows lateral transition areas of the design of FIGS. 1A and 1B more clearly.

The lateral transition areas are shown more clearly in FIG. 3.

Each dome comprises a first portion (A01*c*) which provides a height increase from a lowest height at the boundary with the central periodic rib area (A01*p*) to a maximum height (H), and a second portion which provides a more sharply curved height decrease from the maximum height (H) to the lowest height where the diaphragm is attached to the voice coil (C). This second portion is the outermost area (A00). The second portion (A00) has the same shape in a y-axis cross section, so that the curvature from the highest point down to the well for the voice coil is the same all around the structure.

Each first portion (A01*c*) is in the form of a concave surface, and is generally spherical in the regions of the corners.

Figure 4:
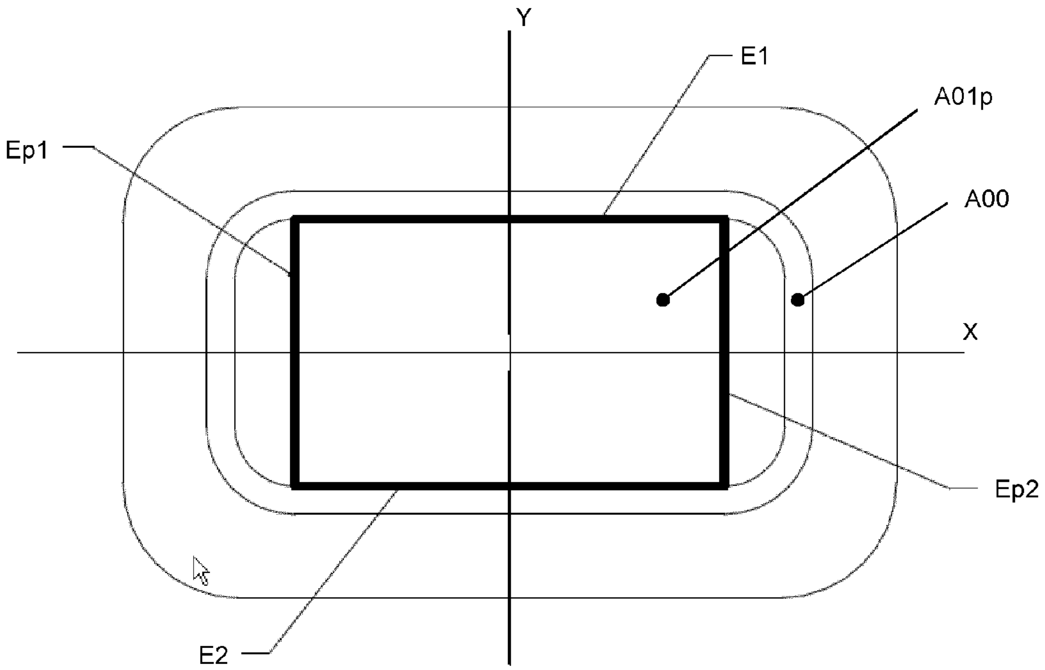
FIG. 4 shows the rectangular shape of the periodic rib area.

FIG. 4 shows the rectangular shape of the periodic rib area (A01*p*). This rectangle is bounded by longer sides E1 and E2 at the inner edge of the outermost area (A00) and by shorter sides Ep1 and Ep2. These shorter sides extend between the ends of the corner curves of the inner edge of the outermost area (A00), so that the sides E1, E2, Ep1 and Ep2 define the largest rectangle that can fit within the outermost area (A00).

Figure 5:
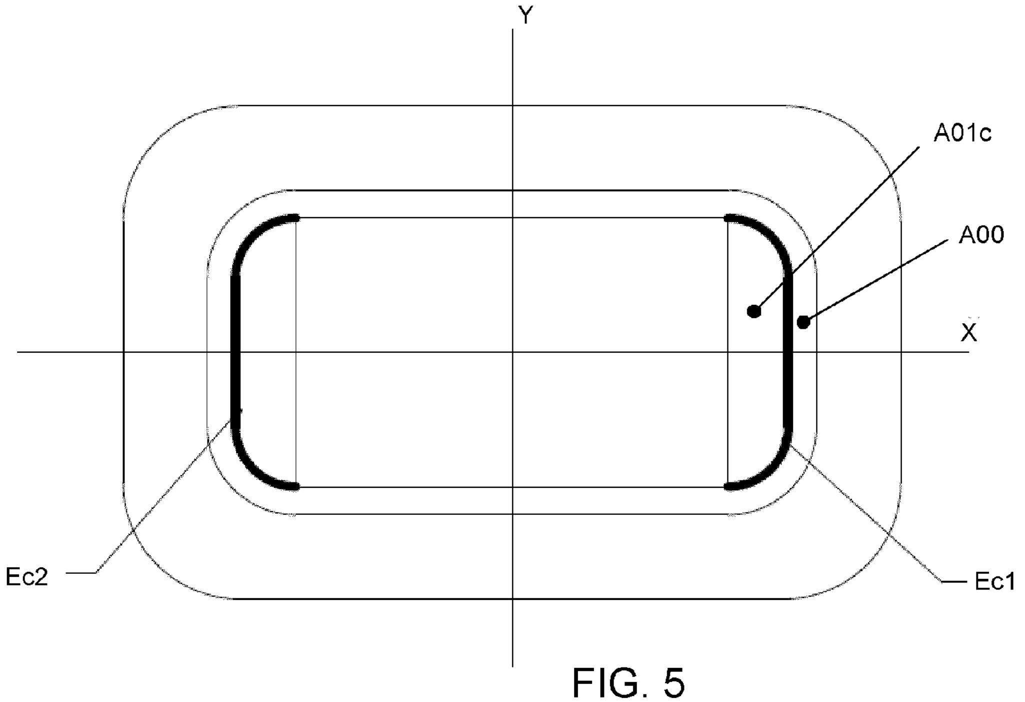
FIG. 5 shows the curved edges of the first portion of the lateral transition areas of FIG. 2.

FIG. 5 shows the curved edges Ec1, Ec2 which define the end of the first portion (A01*c*). The edges Ec1 and Ec2 are formed from the shorter sides of the edges of the outermost area (A00) but also the curved corners. Because the lateral transition areas (A01*c*) are bounded by these curved corners, they are also more rigid in the x axis direction than the periodic rib area (A01*p*).

Referring back to FIG. 3, the second portion of the dome (corresponding to outermost area A00) has a smooth transition to the first portion (A01*c*) and a discontinuous transition to the lowest height where the diaphragm is attached to the voice coil. The smooth transition is at the maximum height H, whereas the transition between the second portion of the dome and the periodic rib area (A01*p*) is at the lowest height. This gives good overall stiffness.

The lateral transition areas (A01*c*) have a height (H) which is not exceeded by the height of the innermost periodic rib area (A01*p*).

The longer side of the generally rectangular diaphragm outer shape is preferably less than 100 times the diaphragm thickness.

Figure 6:
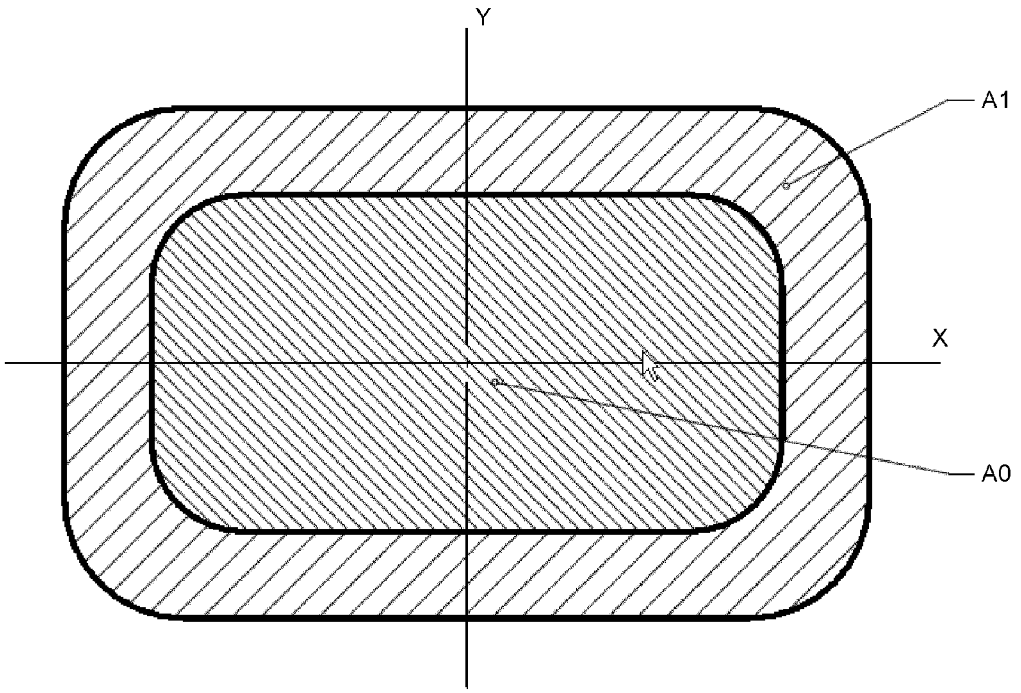
FIGS. 6 and 7 are used to show more clearly some of the areas defined for the purposed of explaining the invention.
Figure 7:
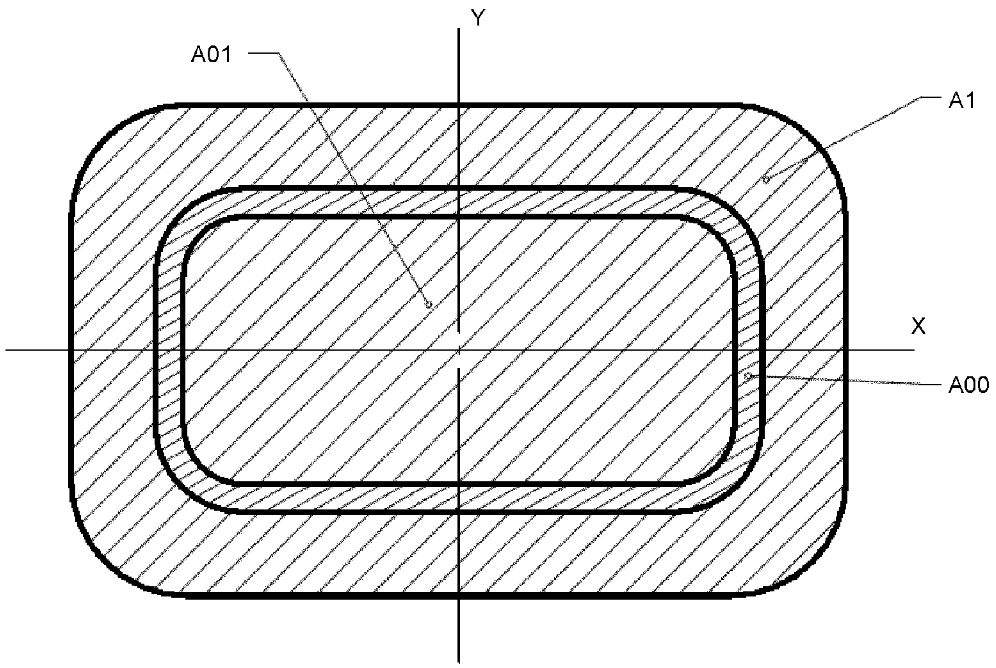

FIGS. 6 and 7 are used to show more clearly some of the areas defined above.

FIG. 6 shows the outer rim (A1) and the inner section (A0).

FIG. 7 shows that the inner section (A0) is formed of the outermost area (A00) and the inner area (A01) (which is itself formed of the periodic rib area (A01*p*) and the lateral transition areas (A01*c*) as shown in FIG. 1B).

Figure 8:
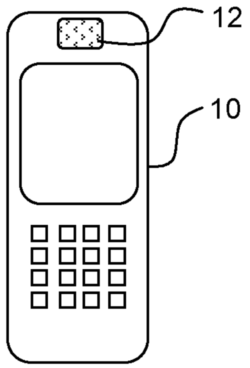
FIG. 8 shows a mobile phone including the loudspeaker of the invention.

FIG. 8 shows a mobile phone 10 including the loudspeaker system 12 of the invention.

The invention is of particular interest for miniature speakers, for example where the overall thickness of the structure is to be kept as small as possible.

By way of example, the dimensions of the membrane may be such that the dimensions shown in FIG. 1A and FIG. 3 are in the following ranges:

A01 (size of rigid part of diaphragm):

Width: 2 to 6 mm

Length: 4 to 10 mm

Corner Radius: 0.5 to 3 mm

A00 (width of voice coil well and outer curved edge):
0.3-0.6 mm
A01*c* (size of concave part of transition region):
Width: corresponds to corner radius of A01 (0.5 to 3 mm)
Length: corresponds to A01 width (2 to 6 mm)
H (height of structure):
0.2 to 0.8 mm
Number of periodic ribs:
4-20 ribs
Length/width ratio of the rectangle:
1.0-5.0
Thickness of diaphragm:
10-90 μm The ribs can be considered to have a transition region towards the area (A00), when they flatten out. The ribs may flatten out over a similar distance to the width of the concave part of the transition region. However, they are fully flattened over a shorter length than the width of the concave part of the transition region, for example 0.1 to 0.5 times that width.

The permanent magnet has not been shown above. The magnet system is an assembly of one, two or three magnets and ferromagnetic pole caps (i.e. soft magnetic iron) to give the magnetic field the right direction. There are magnet parts on the inside of the coil and other parts on the outside. The speaker needs a so called airgap in the magnet system in which the coil can make its vertical displacement. In this way, the coil is essentially surrounded by the magnet system. The design of the magnet system is not altered by the use of the diaphragm design of the invention, and accordingly a detailed description is not provided. Similarly, the speaker circuitry and the mounting of components are totally routine. The invention resides only in the specific geometrical design of the diaphragm.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage. Any reference signs in the claims should not be construed as limiting the scope.

The invention claimed is:

1. A loudspeaker comprising:
a voice coil; and
a diaphragm attached to the voice coil, the diaphragm having a generally rectangular outer shape and comprising:
an outer rim area having an outer edge and an inner edge, the diaphragm being fixed in position at the outer edge;
and an inner section surrounded by the outer rim area, the inner section comprising:
an outermost area adjacent to the outer rim area and coupled to the voice coil, the outermost area having the same generally rectangular outer shape as the diaphragm; and
an inner area surrounded by the outermost area, the inner area comprising;
a central rib area having a plurality of ribs in a periodic pattern, the ribs being oriented parallel to the shorter sides of the outermost area; and
two lateral transition areas between the edges of the central rib area and the shorter side edges of outermost area.

2. A loudspeaker as claimed in claim 1, wherein the lateral transition areas are mirror symmetric about a line parallel to the shorter edges of the rectangular outer shape.

3. A loudspeaker as claimed in claim 1, wherein the lateral transition areas each comprise a dome.

4. A loudspeaker as claimed in claim 3, wherein each dome comprises a first portion which provides a height increase from a lowest height at the boundary with the periodic rib structure to a maximum height, and a second portion which provides a more sharply curved height decrease from the maximum height to the lowest height where the diaphragm is attached to the voice coil.

5. A loudspeaker as claimed in claim 4, wherein the second portion has a smooth transition to the first portion and a discontinuous transition to the lowest height where the diaphragm is attached to the voice coil.

6. A loudspeaker as claimed in claim 1, wherein the plurality of ribs in the central rib area extend fully between the longer sides of the outermost area.

7. A loudspeaker as claimed in claim 1, wherein the height of the plurality of ribs in the central rib area does not exceed the height of the lateral transition areas.

8. A loudspeaker as claimed in claim 1, wherein the longer sides of the generally rectangular diaphragm are less than 100 times the diaphragm thickness.

9. A loudspeaker as claimed in claim 1, wherein the generally rectangular outer shape of the diaphragm comprises a rectangle with rounded corners having substantially the same radius.

10. A loudspeaker as claimed in claim 9, wherein the width of the lateral transition areas in a direction parallel to the longer sides of the generally rectangular shape of the diaphragm corresponds to the radius of the corner curves of an inner edge of the outermost area.

11. A portable electronic device comprising a loudspeaker, the loudspeaker comprising:
a voice coil; and
a diaphragm attached to the voice coil,
wherein the diaphragm has a generally rectangular outer shape, and comprises an outer rim having an outer edge at which the diaphragm is fixed in position and an inner section within the outer rim, wherein the inner section comprises:
an outermost area which is coupled to the voice coil and having the same generally rectangular outer shape;
an inner area comprising a periodic rib structure, with the ribs running parallel to the shorter side of the rectangular outer shape, and two lateral transition areas between the edges of the periodic rib structure and the shorter side edges of outermost area.

12. A portable electronic device as claimed in claim 11, comprising a mobile telephone.

* * * * *